(12) United States Patent
Baldwin et al.

(10) Patent No.: US 11,850,458 B2
(45) Date of Patent: Dec. 26, 2023

(54) FLOW CONTROL DEVICE FOR PARTICLE CONCENTRATION MEASUREMENT SENSOR

(71) Applicant: Kidde Technologies, Inc., Wilson, NC (US)

(72) Inventors: Eli Baldwin, Knightdale, NC (US); James Allen Varnell, Black Creek, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 278 days.

(21) Appl. No.: 17/234,258

(22) Filed: Apr. 19, 2021

(65) Prior Publication Data

US 2022/0331634 A1 Oct. 20, 2022

(51) Int. Cl.
| | |
|---|---|
| *A62C 37/10* | (2006.01) |
| *A62C 35/02* | (2006.01) |
| *A62C 37/50* | (2006.01) |
| *G01N 1/22* | (2006.01) |
| *G01N 21/53* | (2006.01) |

(52) U.S. Cl.
CPC ............ *A62C 37/10* (2013.01); *A62C 35/023* (2013.01); *A62C 37/50* (2013.01); *G01N 1/2247* (2013.01); *G01N 21/534* (2013.01)

(58) Field of Classification Search
CPC ....... A62C 37/10; A62C 37/50; A62C 35/023; G01N 1/2247; G01N 21/534; G01N 2015/0046; G01N 2015/0693; G01N 15/06
See application file for complete search history.

(56) References Cited

U.S. PATENT DOCUMENTS

| | | | | |
|---|---|---|---|---|
| 3,833,305 | A | * | 9/1974 | Porter ................... G01N 21/15 356/438 |
| 5,026,155 | A | * | 6/1991 | Ockovic .............. G01N 15/065 356/336 |
| 5,992,216 | A | * | 11/1999 | Wang .................... G01N 15/06 73/31.03 |
| 6,829,044 | B2 | * | 12/2004 | Liu ....................... G01N 15/065 250/222.2 |
| 7,958,794 | B2 | | 6/2011 | Sahibzada et al. |
| 8,077,317 | B2 | | 12/2011 | Ayers et al. |
| 9,207,172 | B2 | | 12/2015 | Seebaluck et al. |
| 2006/0060140 | A1 | * | 3/2006 | Lee .................... C23C 16/45574 156/345.33 |
| 2016/0001391 | A1 | * | 1/2016 | Nacey .................. B23K 31/125 219/137 R |

(Continued)

FOREIGN PATENT DOCUMENTS

| | | |
|---|---|---|
| EP | 0290412 A2 | 11/1988 |
| GB | 2549784 A | 11/2017 |

OTHER PUBLICATIONS

Extended European Search Report for EP Application No. 22163540. 2, dated Aug. 9, 2022, pp. 1-8.

*Primary Examiner* — Sang H Nguyen
(74) *Attorney, Agent, or Firm* — CANTOR COLBURN LLP

(57) ABSTRACT

A flow control device includes a flow shield defining a volume and a plurality of shield openings of the flow shield arranged such that gas entering the volume must pass through at least one of the plurality of shield openings. The flow control device also includes a flow restrictor to define an opening for the gas exiting the volume.

16 Claims, 3 Drawing Sheets

(56) References Cited

U.S. PATENT DOCUMENTS

2019/0145545 A1\* 5/2019 Bartels ................. F16K 15/026
  137/514
2019/0290950 A1\* 9/2019 Hagge .................... A62C 35/13
2020/0025665 A1 1/2020 Trainer \* cited by examiner

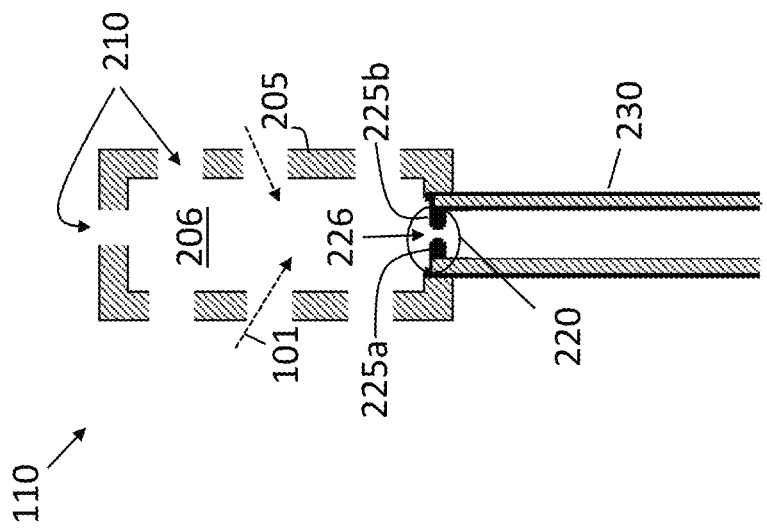
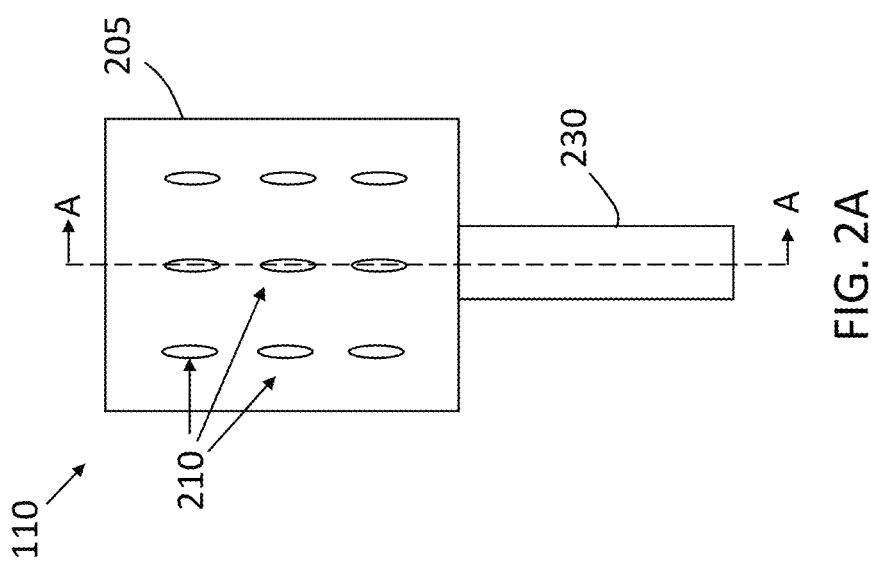

FLOW CONTROL DEVICE FOR PARTICLE CONCENTRATION MEASUREMENT SENSOR

BACKGROUND

Exemplary embodiments pertain to the art of particle concentration measurement and, in particular, to a flow control device for particle concentration measurement sensor.

The distribution and concentration of particles in an environment may be determined for a number of reasons. In the exemplary case of a fire suppression system that deploys an agent to extinguish a fire, the concentration of fire suppression agent in the environment may be determined and used to verify that the fire suppression agent has reached a sufficient concentration or to control the release of additional agent. In other scenarios, the concentration of a particular (hazardous) material in the air may trigger an alert.

BRIEF DESCRIPTION

In one embodiment, a flow control device includes a flow shield defining a volume and a plurality of shield openings of the flow shield arranged such that gas entering the volume must pass through at least one of the plurality of shield openings. The flow control device also includes a flow restrictor to define an opening for the gas exiting the volume.

Additionally or alternatively, in this or other embodiments, the plurality of shield openings is arranged in one or more layers relative to the volume.

Additionally or alternatively, in this or other embodiments, the flow control device also includes a channel configured to direct the gas from the volume to an inlet of a sensor.

Additionally or alternatively, in this or other embodiments, the flow restrictor includes a first restrictor and a second restrictor arranged to define an orifice between the volume and the channel.

Additionally or alternatively, in this or other embodiments, the channel is copper.

Additionally or alternatively, in this or other embodiments, the sensor is a particle concentration measurement sensor.

Additionally or alternatively, in this or other embodiments, the gas includes particles of fire suppression agent and the particle concentration measurement sensor measures a concentration of the fire suppression agent in the gas.

Additionally or alternatively, in this or other embodiments, the flow shield is aluminum.

Additionally or alternatively, in this or other embodiments, the flow shield is steel.

In another embodiment, a method includes forming a flow shield to define a volume and forming a plurality of shield openings as perforations in the flow shield such that gas entering the volume must pass through at least one of the plurality of shield openings. The method also includes arranging a flow restrictor within the volume to define an opening for the gas exiting the volume.

Additionally or alternatively, in this or other embodiments, the method also includes arranging the plurality of shield openings in one or more layers relative to the volume.

Additionally or alternatively, in this or other embodiments, the method also includes forming a channel configured to direct the gas from the volume to an inlet of a sensor.

Additionally or alternatively, in this or other embodiments, the method also includes forming the flow restrictor to include a first restrictor and a second restrictor arranged to define an orifice between the volume and the channel.

Additionally or alternatively, in this or other embodiments, the channel is copper.

Additionally or alternatively, in this or other embodiments, the sensor is a particle concentration measurement sensor Additionally or alternatively, in this or other embodiments, the gas includes particles of fire suppression agent and the particle concentration measurement sensor measures a concentration of the fire suppression agent in the gas.

Additionally or alternatively, in this or other embodiments, the flow shield is aluminum.

Additionally or alternatively, in this or other embodiments, the flow shield is steel.

BRIEF DESCRIPTION OF THE DRAWINGS

The following descriptions should not be considered limiting in any way. With reference to the accompanying drawings, like elements are numbered alike:

FIG. 2A is a side view of a flow control device according to an exemplary embodiment;

FIG. 2B is a cross-sectional view through A-A of the flow control device shown in FIG. 2A;

DETAILED DESCRIPTION

A detailed description of one or more embodiments of the disclosed apparatus and method are presented herein by way of exemplification and not limitation with reference to the Figures.

As previously noted, determining the concentration of a type of particle in an environment may have different applications. Embodiments of the systems and methods detailed herein relate to a flow control device for particle concentration measurement sensor. The particle concentration measurement sensor may be part of a fire suppression system, for example, and may measure the concentration of a fire suppression agent in the environment. The particle concentration measurement sensor includes an inlet to draw in particle-laden gas from the environment. Due to differences in sizes of the different components of the particle-laden gas, the inlet may not capture particles in the same concentrations in which they are present in the environment. As detailed, the flow control device at the inlet of the particle concentration measurement sensor ensures a consistent extraction of particle-laden gas in order to accurately determine the concentration of particles of interest (e.g., fire suppression agent).

Figure 1:
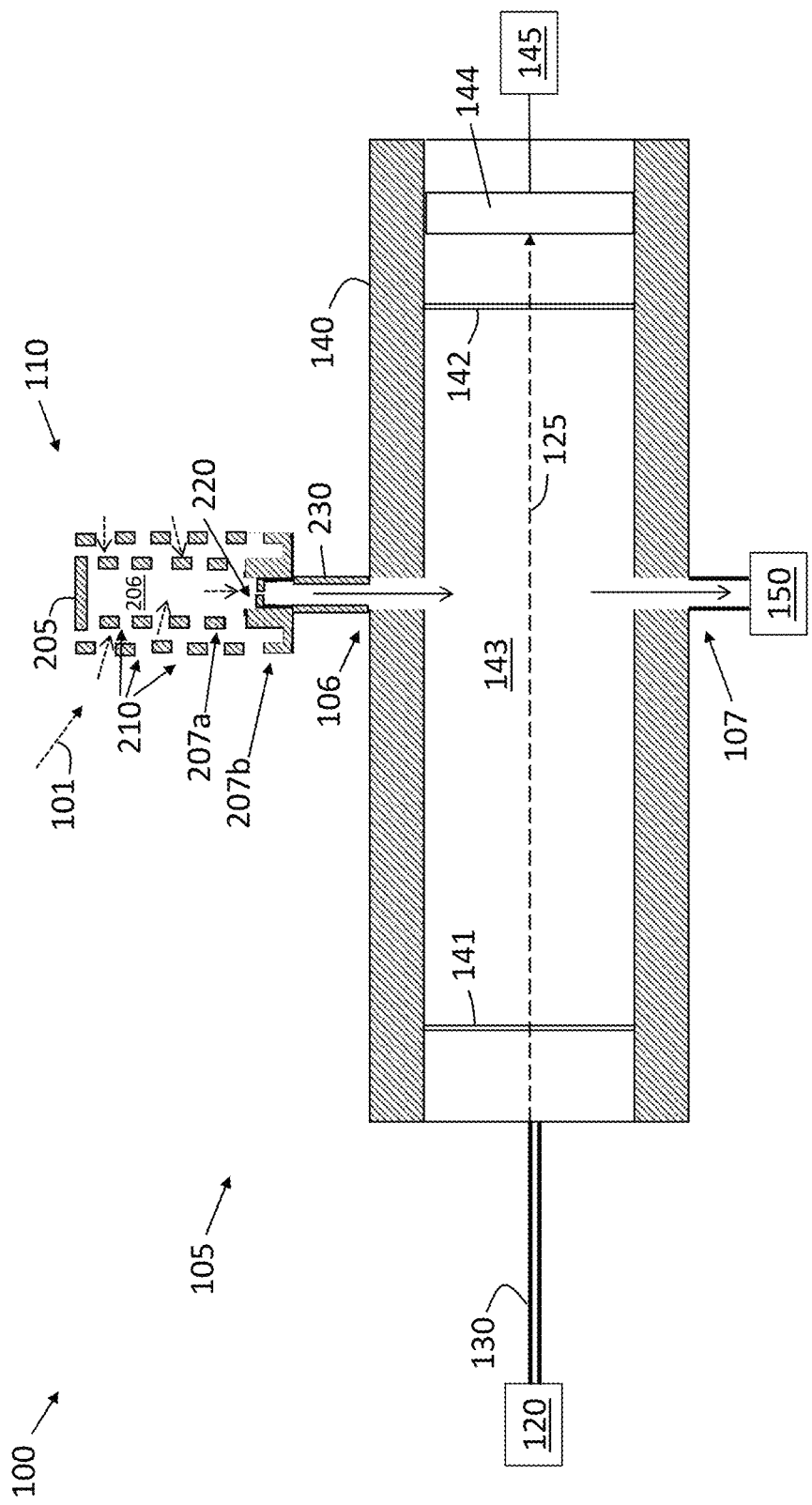
FIG. 1 is a cross-sectional view of a particle concentration measurement sensor with a flow control device according to one or more embodiments.

FIG. 1 is a cross-sectional view of a particle concentration measurement sensor 105 with a flow control device 110 according to one or more embodiments. According to an exemplary embodiment, the particle concentration measurement sensor 105 is part of a fire suppression system 100 and is used to determine the concentration of a fire suppression agent in particle-laden gas 101 that is drawn into a housing 140 of the particle concentration measurement sensor 105 through the flow control device 110 at an inlet 106. A vacuum source 150 may be coupled at an outlet 107 of the housing 140 to draw gas through from the inlet 106 to the outlet 107. As the cross-sectional view of the particle concentration measurement sensor 105 indicates, a first window 141 and a second window 142 define an interaction region 143 within the housing 140.

According to the exemplary embodiment of the particle concentration measurement sensor 105 shown in FIG. 1, a light source 120 provides input light 125 via an optical fiber 130 to the housing 140. In the interaction region 143, the light 125 and the particle-laden gas 101 entering the housing 140 via the inlet 106 interact. This interaction is detected at a detector 144 outside the interaction region 143. Specifically, the detector 144 measures an intensity of the post-interaction light that corresponds with the particle of interest (e.g., fire suppression agent) in the particle-laden gas 101. A controller 145 may map that intensity to a concentration. According to alternate embodiments, the particle concentration measurement sensor 105 may include a mirror at the location at which the detector 144 is shown in FIG. 1. The mirror reflects the result of the light interaction in the interaction region 143 back through the second window 142 and first window 141 toward the light source 120. Thus, the detector 144 and controller 145 may be located at the same side as the light source 120 in the alternate embodiment.

The flow control device 110, according to one or more embodiments, includes features that ensure that the concentration of the particle of interest (e.g., fire suppression agent) in the environment is accurately reflected within the housing 140 in the interaction region 143. The flow control device 110 includes a flow shield 205 with shield openings 210 (i.e., perforations or entryways) that slow the flow of particle-laden gas 101 flowing therethrough into a volume 206. A first layer 207a and a second layer 207b (generally referred to as 207) of the shield openings 210 are shown around the volume 206 in FIG. 1. That is, particle-laden gas 101 entering the volume 206 must pass through a shield opening 210 in one or both layers 207 according to the exemplary embodiment shown in FIG. 1. The flow shield 205 also includes a flow restrictor 220 within the volume 206 that restricts the opening between the volume 206 and a channel 230 to the inlet 106 of the housing 140. The channel 230 between the flow shield 205 and the inlet 106 ensures laminar flow of the particle-laden gas 101 that is captured by the flow control device 110 into the inlet 106.

Based on the shield openings 210, flow of the particle-laden gas 101 within the volume 206 that is defined by the flow shield 205 is slower and less turbulent than in the environment. The slowing of the flow in the volume 206, based on the shield openings 210 of the flow shield 205, keeps larger particles from escaping entry into the housing 140 through the flow restrictor 220. The flow shield 205 may be aluminum or steel, for example. The flow restrictor 220 is further discussed with reference to FIG. 2. The flow restrictor 220 provides a near-constant extraction rate of the particle-laden gas 101 from the environment. This near-constant extraction rate is achieved because the magnitude of the pressure drop across the flow restrictor 220 far exceeds any dynamic pressure variations observed within the volume 206. Based on the presence of the flow restrictor 220, a stronger vacuum may be needed from the vacuum source 150 to achieve an optimal extraction rate of particle-laden gas 101 from the environment. The flow of the particle-laden gas 101 into the housing 140 is driven by pressure gradients. In that regard, the pressure difference between the inlet 106 and outlet 107 of the housing is minimal, and the largest pressure difference is across the flow restrictor 220. The length of the channel 230 is not intended to be limited by the exemplary depiction. The channel 230 may be copper, for example.

Figure 3B:
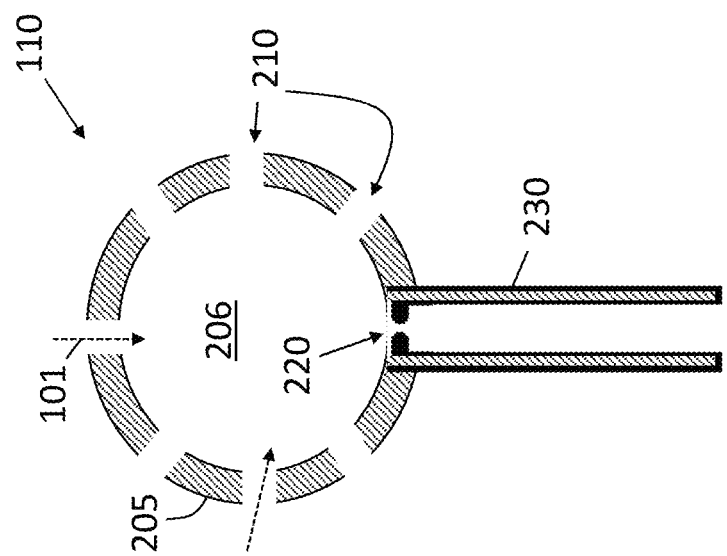
FIG. 3B is a cross-sectional view through B-B of the flow control device shown in FIG. 3A.
Figure 3A:
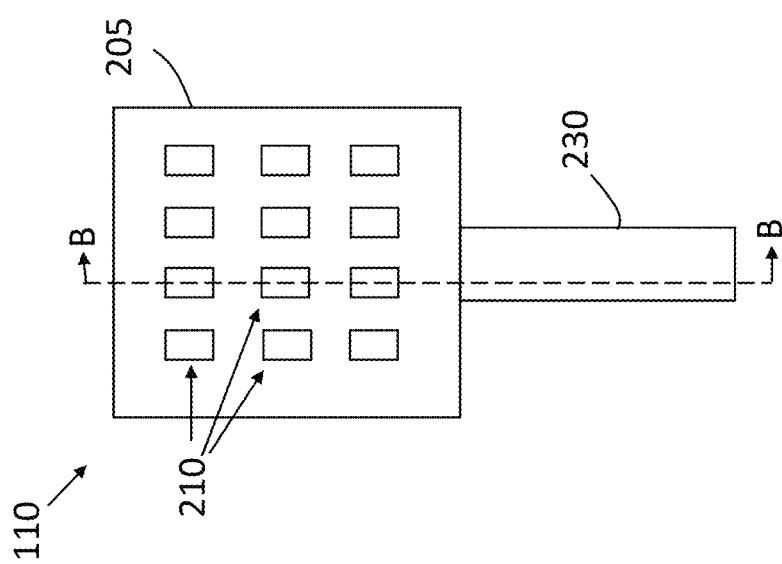
FIG. 3A is a side view of a flow control device according to an exemplary embodiment.

FIGS. 2A and 3A show side views of two exemplary embodiments of the flow control device 110 according to one or more embodiments, and FIGS. 2B and 3B respectively show cross-sections of the Exemplary flow control devices 110 shown in FIGS. 2A and 3A. As FIGS. 2A and 2B illustrate, the shield openings 210 may have different shapes. As FIGS. 2B and 3B illustrate, the cross-sectional shape of the flow shield 205 is not limited by the exemplary embodiment of the flow control device 110 shown in FIG. 1.

FIG. 2A is a side view of a flow control device 110. The shield openings 210 of the exemplary flow control device 110 shown in FIG. 2A are oval in shape. FIG. 2B is a cross-sectional view of the exemplary flow control device 110 shown in FIG. 2A. As FIG. 2B illustrates, the exemplary flow control device 110 of FIG. 2 does not include an additional layer 207 of shield openings 210 on each side as in FIG. 1. In alternate embodiments, the flow control device 110 may instead include additional (i.e., more than two) layers 207 of shield openings 210 as compared with the example shown in FIG. 1 in alternate embodiments. The expected turbulence in the environment may drive a selection of the number of layers 207 of shield openings 210 used in the flow control device 110. The flow restrictor 220 is further detailed in FIG. 2B. As shown, the flow restrictor 220 is made up of a first restrictor 225a and a second restrictor 225b that are arranged to define an orifice 226 between them. More specifically, the relative spacing between the first and second restrictors 225a, 225b defines a size of the orifice 226 through which particles in the particle-laden gas 101 may enter the channel 230 and, subsequently, the inlet of the housing 140 of the particle concentration measurement sensor 105. The closer the first and second restrictors 225a, 225b are arranged to each other, the smaller the orifice 226 and, thus, the more restricted the flow from the volume 206 into the channel 230.

FIG. 3A is a side view of an exemplary flow control device 110 according to one or more embodiments. The shape of the shield openings 210 shown in FIG. 3A is rectangular. In alternate embodiments, the shield openings 210 may have a round, square, or other shape and are not limited by the oval and rectangular shapes illustrated in FIGS. 2B and 3B. FIG. 3B is a cross-sectional view of the flow control device 110 shown in FIG. 3A. As FIG. 3B shows, the cross-sectional shape of the flow shield 205 is circular. In alternate embodiments, the cross-sectional shape of the flow shield 205 is not limited by the exemplary illustrations. The numbers of shield openings 210 are also not limited by any exemplary illustration. Like the number of layers 207 of shield openings 210, the number and relative spacing of the shield openings 210 in each layer may be selected based on the expected turbulence in the environment and, thus, on how much the flow of the particle-laden gas 101 may need to be slowed.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sensor that measures a fire extinguishing agent in a gas, the sensor comprising:
    a housing with an inlet and an outlet;
    a flow control device coupled to the inlet, the flow control device arranged to ensure that a concentration of particles of interest is accurately reflected in the housing, the flow control device comprising:
        a flow shield defining a volume, the flow shield including: a plurality of shield openings formed therein;
        a channel that directs the gas from the volume to the inlet of the sensor; and
        a flow restrictor within the volume that creates a pressure drop for the gas flowing from the volume to the inlet.

2. The sensor according to claim 1, wherein the plurality of shield openings is arranged in one or more layers relative to the volume.

3. The sensor according to claim 1, wherein the flow restrictor includes a first restrictor and a second restrictor arranged to define an orifice between the volume and the channel.

4. The sensor according to claim 1, wherein the channel is copper.

5. The sensor according to claim 1, wherein the sensor is a particle concentration measurement sensor.

6. The flow control device according to claim 5, wherein the gas includes particles of fire suppression agent and the particle concentration measurement sensor measures a concentration of the fire suppression agent in the gas.

7. The sensor according to claim 1, wherein the flow shield is aluminum.

8. The sensor according to claim 1, wherein the flow shield is steel.

9. A method of fabricating a sensor, the sensor including a housing (140) with an inlet (106) and an outlet (107), the method comprising:
    forming a flow shield to define a volume;
    forming a plurality of shield openings as perforations in the flow shield openings;
    arranging a flow restrictor within the volume;
    coupling the volume to the inlet with a channel configured to direct the gas from the volume to an inlet of a sensor;
    wherein the flow restrictor is arranged such that it creates a pressure drop for gas flowing from the volume to the inlet.

10. The method according to claim 9, further comprising arranging the plurality of shield openings in one or more layers relative to the volume.

11. The method according to claim 9, further comprising forming the flow restrictor to include a first restrictor and a second restrictor arranged to define an orifice between the volume and the channel.

12. The method according to claim 9, wherein the channel is copper.

13. The method according to claim 9, wherein the sensor is a particle concentration measurement sensor.

14. The method according to claim 13, wherein the gas includes particles of fire suppression agent and the particle concentration measurement sensor measures a concentration of the fire suppression agent in the gas.

15. The method according to claim 9, wherein the flow shield is aluminum.

16. The method according to claim 9, wherein the flow shield is steel.

* * * * *